H. W. SWOPE.
RESILIENT WHEEL.
APPLICATION FILED AUG. 5, 1916.
1,250,529.
Patented Dec. 18, 1917.
2 SHEETS—SHEET 2.
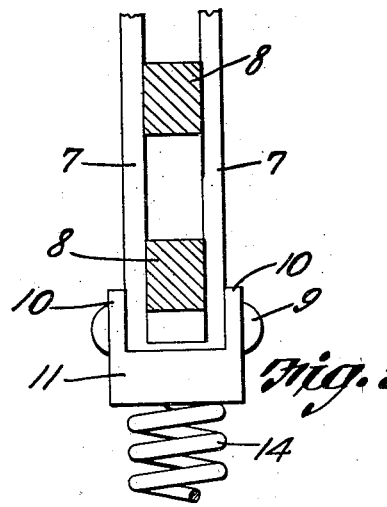
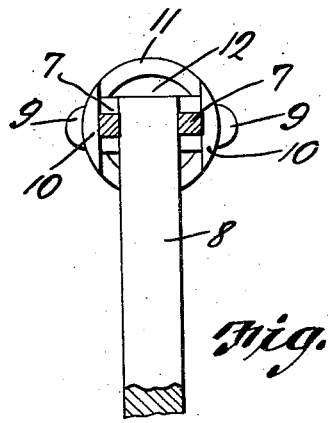
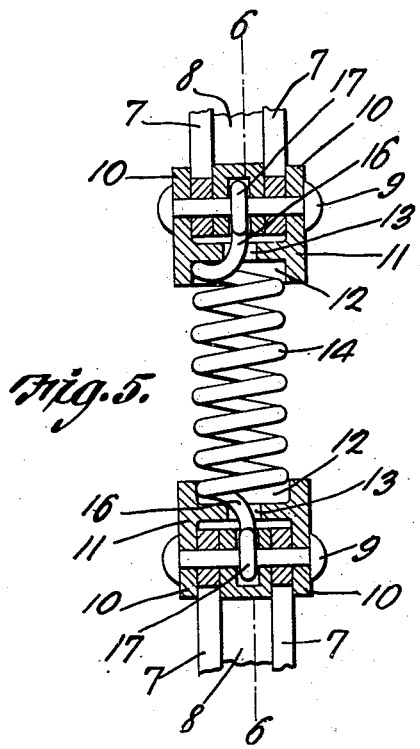
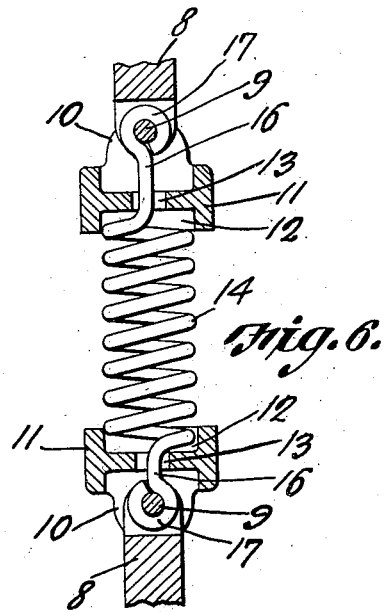
Witnesses
H. W. Swope   Inventor
by C. A. Snow & Co.
Attorneys

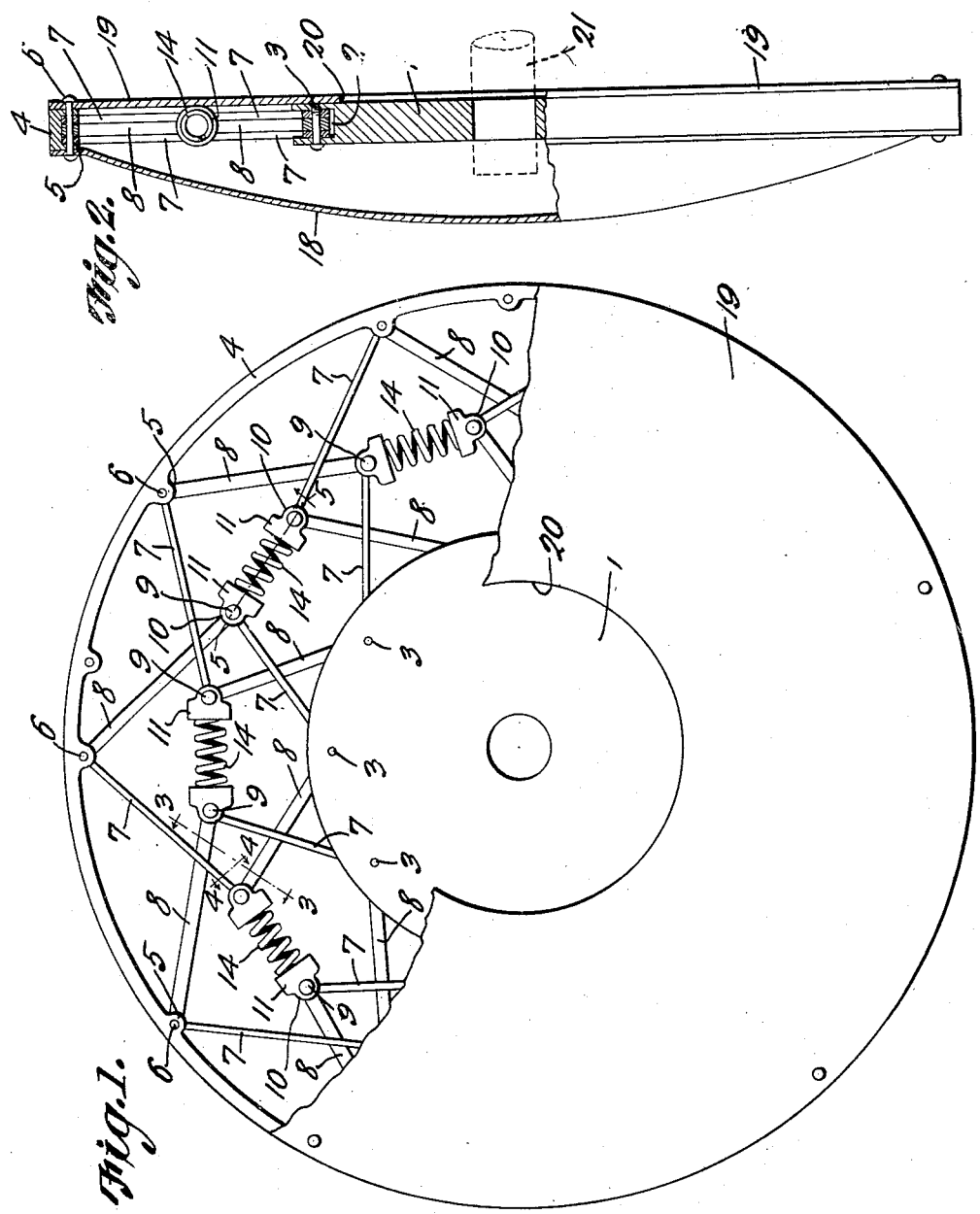

UNITED STATES PATENT OFFICE.

HIRAM W. SWOPE, OF SEDALIA, MISSOURI.

RESILIENT WHEEL.

1,250,529.  Specification of Letters Patent.  Patented Dec. 18, 1917.

Application filed August 5, 1916. Serial No. 113,336.

*To all whom it may concern:*

Be it known that I, HIRAM W. SWOPE, a citizen of the United States, residing at Sedalia, in the county of Pettis and State of Missouri, have invented a new and useful Resilient Wheel, of which the following is a specification.

This invention relates to resilient wheels of that type particularly designed for use in connection with vehicles and adapted for use as a substitute for the ordinary wheels to which pneumatic tires are applied.

One of the objects of the invention is to provide a novel arrangement of spring controlled toggles constituting the connections between the hub and the rim of the wheel, and which toggles are disposed in interfitting relation whereby side strains are resisted and lateral distortion of the wheel prevented.

A further object is to provide a wheel of this character the working parts of which are readily accessible and the operation of which parts will not be interfered with by mud or the like coming into contact therewith.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a side elevation of a wheel embodying the present improvements, a portion of the inner cover plate being broken away.

Fig. 2 is a view partly in transverse section and partly in elevation of the wheel.

Fig. 3 is an enlarged section on line 3—3 Fig. 1.

Fig. 4 is an enlarged section on line 4—4 Fig. 1.

Fig. 5 is an enlarged section on line 5—5 Fig. 1.

Fig. 6 is a section on line 6—6 Fig. 5.

Referring to the figures by characters of reference 1 designates a hub provided, in its periphery, with an annular groove 2. Extending transversely of this groove are regularly spaced pivot pins 3. The rim 4 of the wheel is provided at regular intervals with inwardly extending ears 5 through which extend pivot pins 6.

Mounted on each of the pins 3 and 6 are spaced links 7 and an interposed link 8. A pair of spaced links extending from each pin 6 are pivotally mounted on a pin 9 which also engages the corresponding single link 8 extending from the hub 1. The links projecting from each pin 6 diverge toward the hub, while those extending from each pin 3 diverge toward the rim. Thus the links 7 and 8 extending from the rim and hub are disposed in pairs and, being pivotally connected, form toggles. Furthermore the pair of links 7 extending from each pin 6 extend across opposite sides of the single link 8 extending from the next adjoining pin 6 and, likewise, the pair of links 7 extending from each pin 3 extend across opposite sides of the single link 8 extending from the next adjoining pin 3. Thus while each link is free to move relative to the adjacent link of the next toggle, each link will act as a brace to prevent lateral shifting of the links crossed thereby and, consequently, side strain is resisted and lateral distortion of the wheel prevented. Each pin 9 which connects the links of each toggle is extended through ears 10 formed on a block 11 and this block is provided in one end with a socket 12 and with a central opening 13. The toggles are disposed in pairs, the links of one toggle of each pair converging toward the links of the other toggle of said pair. The blocks 11 upon the toggles of each pair are oppositely disposed and interposed between these opposed blocks of each pair is a coiled spring 14 the ends of which are seated in the sockets 12. The end convolutions of each spring merge into stems 16 which extend through the openings 13 and have terminal eyes 17 engaging the pivot pins 9. Thus the blocks are not only pressed apart by the springs 14 but they are also tied together by said springs.

For the purpose of preventing the admission of dirt and moisture to the working parts of the wheel, a concavo-convex disk 18 is preferably secured to the outer side of the rim 4 as shown particularly in Fig. 2, while a flat disk 19 is secured to the other side of the rim 4 and has a central circular opening 20 normally concentric with the hub and lapping the peripheral portion of said hub. By providing the concavo-convex disk 18, the end of an axle 21 extending through the hub will be cleared by the disk.

It will be obvious that when the rim 4 is shifted relative to the hub 1 the toggles will be contracted at certain points and will thus cause the blocks 11 of each pair of toggles to thrust toward each other and place the spring 14 under increased compression. This will result in a cushioning action. The rebound or return movement of the rim relative to the hub will likewise be retarded by certain of the springs interposed between the toggles and which, by being anchored to the pins 9, retard the movement of the blocks 11 away from each other after reaching their normal positions.

A resilient wheel such as herein described constitutes an efficient substitute for the ordinary vehicle wheel utilizing a pneumatic tire and is advantageous because the cushioning action is produced by the compression of the springs interposed between toggles. The novel arrangement of the toggles described results in the resistance of side strains and the prevention of lateral distortion of the wheel and, consequently, the wheel will remain true at all times while in use.

Obviously instead of providing springs as cushions between the blocks, blocks of rubber or other resilient material may be interposed between the toggles. This structure is so obvious that a detailed description or illustration thereof is not deemed necessary. It is also to be understood that instead of utilizing a single annular series of toggles such as described, two or more annular series can be used where a very wide wheel is employed. This construction is also deemed to be obvious.

What is claimed is:—

1. A resilient wheel including a hub, a rim, toggles connecting the rim and hub and disposed in pairs, the toggles of each pair being oppositely disposed, each toggle including one member composed of a single link and one member composed of parallel links, the single links of each toggle working between the parallel links of the next adjoining toggle, and cushioning means interposed between and connected to the toggles of each pair.

2. A resilient wheel including a hub, a rim, toggles interposed between and connecting the hub and rim, said toggles being arranged in pairs, the toggles of each pair being oppositely disposed, a block pivotally connected to the intermediate joint of each toggle and having a recess, springs interposed between the blocks on the toggles of each pair and seated in the recesses, and stems extending from the ends of each spring and anchored within the blocks.

3. A resilient wheel including a hub, a rim, toggles connecting the hub and rim and arranged in pairs, the toggles of each pair being oppositely disposed, pivot pins connecting the links of each toggle to form the intermediate joint thereof, a block pivotally mounted on each of said pins and having a recess, springs interposed between the blocks on the toggles of each pair, and stems extending from the springs and through the blocks and engaging said pivots to anchor the springs to the blocks and pivots.

In testimony that I claim the foregoing as my own, I have hereto affixed my signature in the presence of two witnesses.

HIRAM W. SWOPE.

Witnesses:
M. K. SWOPE,
IRA N. SPRECHER.

Copies of this patent may be obtained for five cents each, by addressing the "Commissioner of Patents. Washington, D. C."